United States Patent [19]

Skalka

[11] Patent Number: 4,682,772
[45] Date of Patent: Jul. 28, 1987

[54] PLAYGROUND EQUIPMENT INCLUDING VANDAL RESISTANT MECHANICAL ASSEMBLY

[75] Inventor: Gerald P. Skalka, Washington, D.C.

[73] Assignee: Victor Stanley, Inc., Dunkirk, Md.

[21] Appl. No.: 740,053

[22] Filed: May 30, 1985

[51] Int. Cl.$^4$ .............................................. A63B 9/00
[52] U.S. Cl. .................................... 272/113; 403/260
[58] Field of Search ....................... 272/112, 113, 134;
    403/23, 246, 258, 260, 233–237; 182/179, 187,
    128; 248/235; 5/282 R, 292, 304; 108/153–155

[56] References Cited

U.S. PATENT DOCUMENTS

| | | | |
|---|---|---|---|
| 1,460,928 | 7/1923 | Tilden | 403/260 X |
| 2,815,972 | 12/1957 | Lagervall | 403/260 X |
| 3,297,063 | 1/1967 | McGuire | 403/260 X |
| 4,252,313 | 2/1981 | Skalka | 272/113 |
| 4,270,872 | 6/1981 | Kiyosawa | 403/260 X |

FOREIGN PATENT DOCUMENTS 3402590 8/1985 Fed. Rep. of Germany ...... 272/134
18369 of 1906 United Kingdom .................. 403/23

Primary Examiner—Richard J. Apley
Assistant Examiner—J. Welsh
Attorney, Agent, or Firm—Mason, Fenwick & Lawrence

[57] ABSTRACT

Vandal resistant playground equipment is provided including a pair of parallel U-shaped pipes provided with outwardly extending flange plates which support tubular sleeves which extend in transverse alignment from opposite sides of each flange plate. Horizontal pipes have opposite ends received in the tubular sleeves and extend between the flanges of the U-shaped pipes and are bolted to the pipes by bolts enclosed within one sleeve and extending through an aperture in the flange and engaged with a threaded plug in the end of each pipe.

18 Claims, 14 Drawing Figures

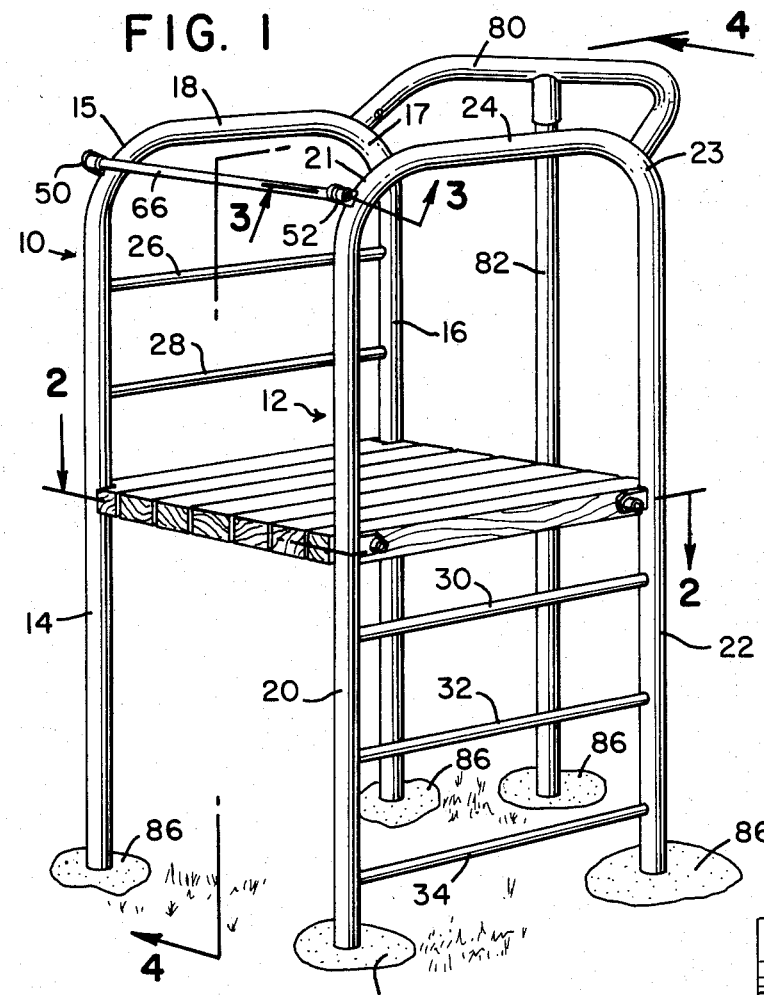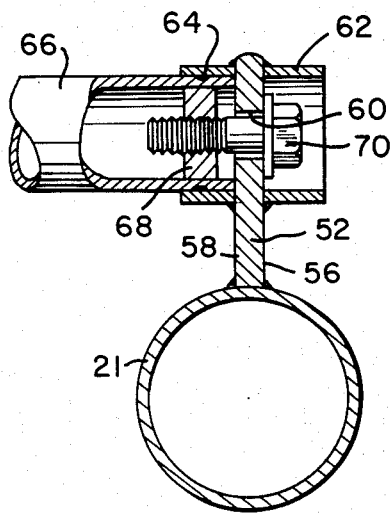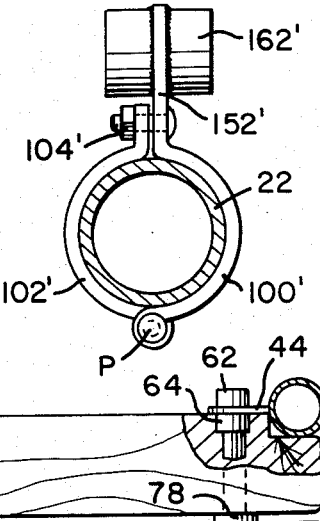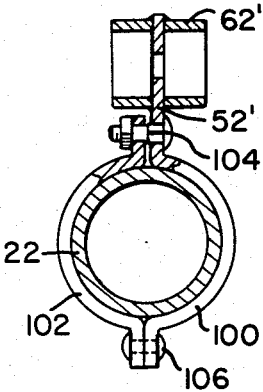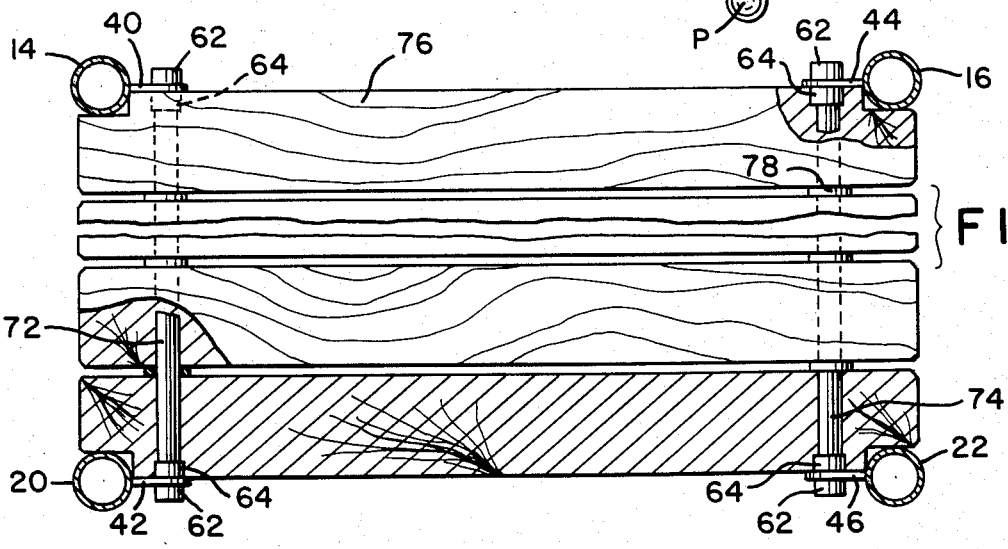

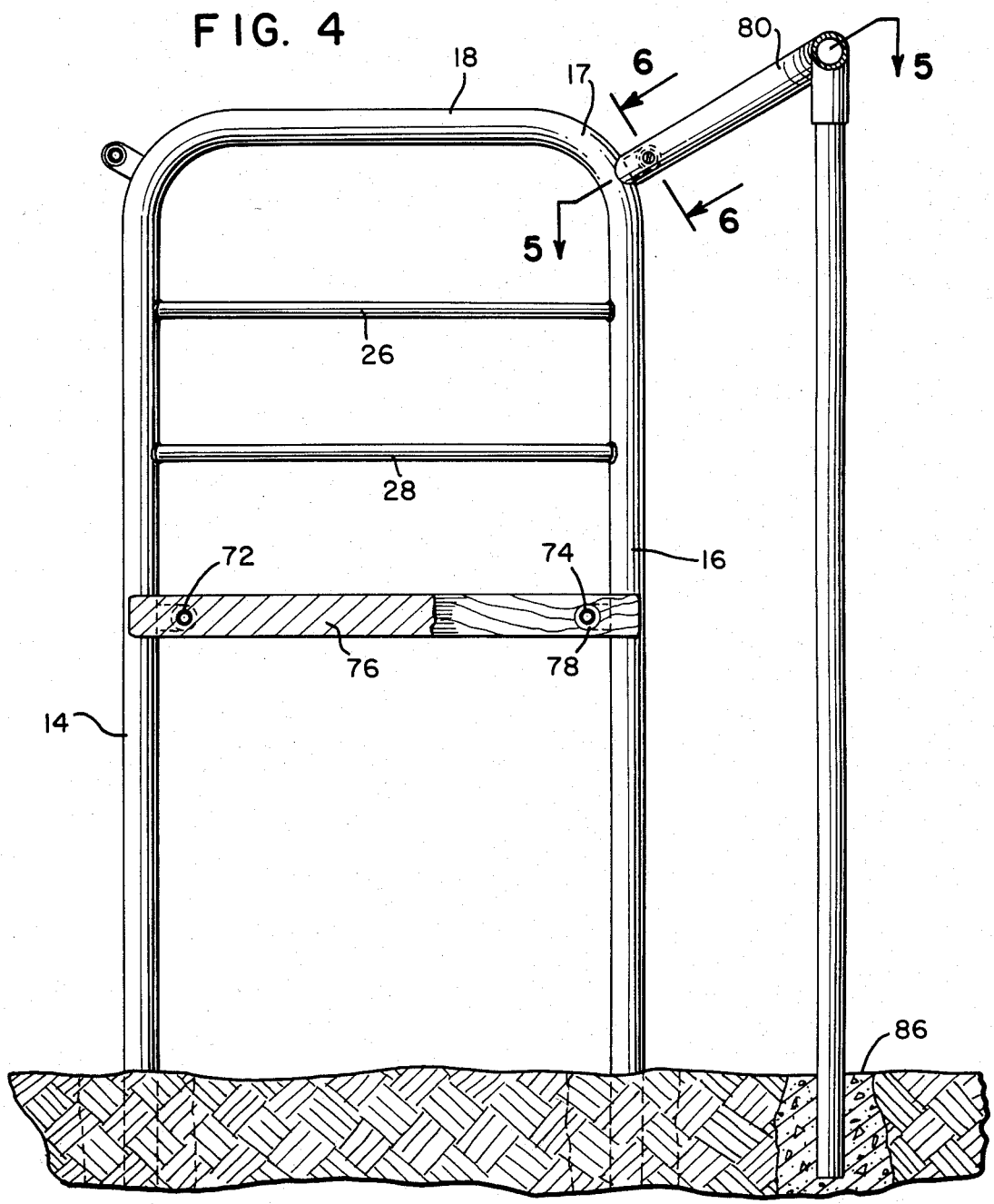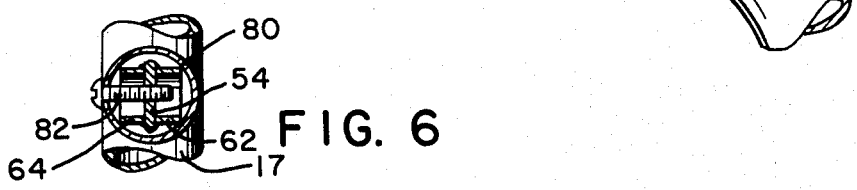

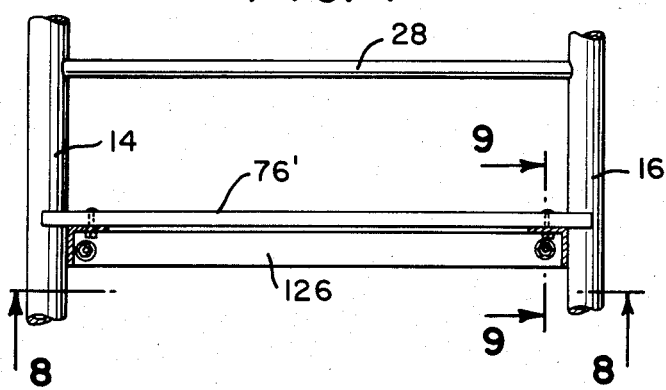
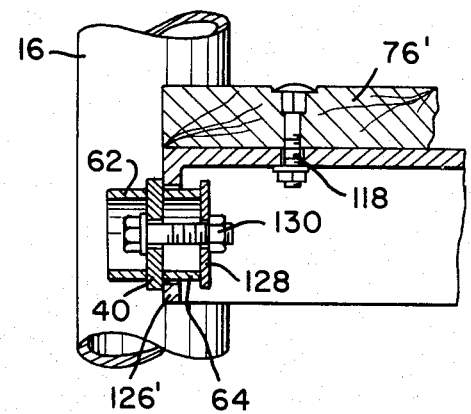
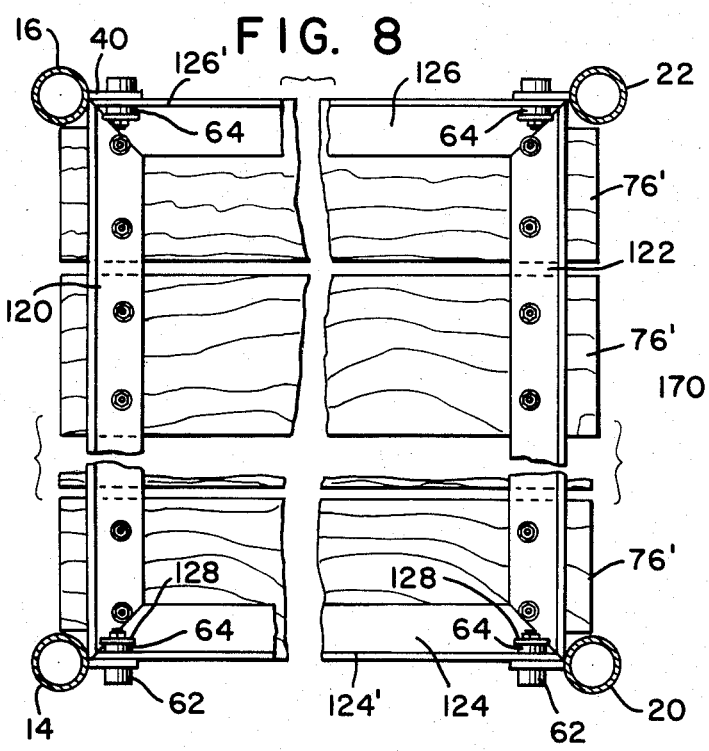
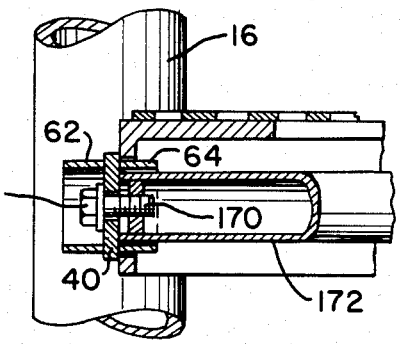
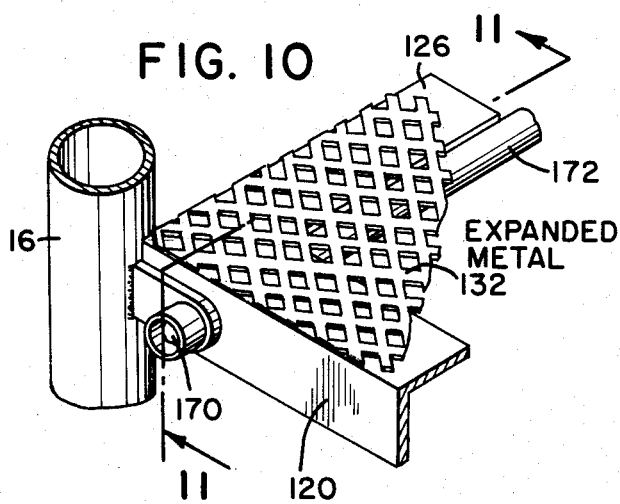
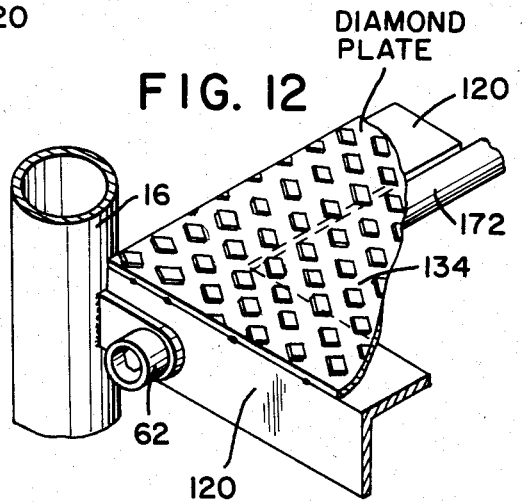

PLAYGROUND EQUIPMENT INCLUDING VANDAL RESISTANT MECHANICAL ASSEMBLY

BACKGROUND OF THE INVENTION

The subject invention is in the field of playground equipment and is more specifically directed to a climbing platform of remarkably rugged and long-lasting character which serves as a base unit to which other accessories such as slides, sliding poles and the like can be attached.

It is a well-known fact that playground equipment should be rugged, safe and resistant to vandalism without being overly expensive. My earlier U.S. Pat. No. 4,252,313 is directed to playground equipment employing wooden post members providing rugged support for metal pipe rungs for permitting users to climb or perform other physical feats in and on the rungs. While the device of that patent represents a substantial improvement over the prior known devices in the same field, the present invention avoids the use of wood in the supporting structure to provide an even more rugged and long-lasting item which is particularly immune to vandalism.

Therefore, it is a primary object of the present invention to provide a new and improved item of playground equipment.

SUMMARY OF THE INVENTION

Achievement of the foregoing object is enabled by the preferred embodiment of the invention through the provision of a unique steel construction which is rugged and totally vandal proof and which serves as a base unit to which other accessories can be attached.

More specifically, the preferred embodiment of the invention comprises a base unit formed of two U-shaped pipe members which are positioned in parallel vertical planes in transverse alignment to each other. Each of the U-shaped pipe members is provided with outwardly extending flange plates aligned with identical flange plates on the other U-shaped pipe member with each of the flange plates having a bolt receiving aperture in its outer extent for connecting transverse horizontal pipe members extending between the U-shaped pipe members.

More specifically, the outwardly extending flanges are also oriented in a vertical plane and open-ended tubular sleeves are welded to each flange on opposite sides of the bolt receiving opening so as to extend a predetermined distance transversely outwardly from opposite surfaces of each flange. Internally mounted transverse support pipes extend between the two U-shaped pipe members with each transverse support pipe having an outer diameter that is sufficiently small to fit in the bore of one of the open-ended tubular sleeve members. Also, each pipe has an internal metal plug fixedly positioned adjacent its outer end with a threaded axial opening being provided in each of the metal plugs. Consequently, the smaller transverse support pipes can be positioned in the tubular sleeve members and a bolt can be inserted from the opposite side to engage the threads in the pipe so that tightening of the bolt effectively pulls the pipe against the side of the flange. The head of the bolt is protected by virtue of being on the inside of the open-ended tubular sleeve member on the side of the flange opposite the pipe. A plurality of such horizontal transverse support pipes are connected between the U-shaped pipe members and can provide support for other structures such as platform means in the form of timber members or the like having holes through which the pipes extend to provide a permanent structure. After all of the bolts have been tightened, the lower ends of the U-shaped pipe members which are positioned in excavations which are locked in position by filling the excavations with concrete. Following setting of the concrete, the U-shaped pipe members are rigidly positioned in the ground and with respect to each other by virtue of the horizontal pipes extending between them. In fact, the connection is so secure that any removal of the bolt does not permit disassembly of the structure and it is consequently essentiallly vandal proof.

Another aspect of the invention permits the external mounting of a larger pipe member on the flange members. More specifically, a larger pipe having an inner diameter of sufficient size is positioned over the open-ended tubular sleeve members with the tubular sleeve members extending diametrically across the width of the pipe. An aperture provided in the side of the larger pipe permits the insertion of a bolt or screw into the aperture in the flange which is also provided with threads to receive same so as to permit the connection of the larger pipe to the main U-shaped pipe member; optionally, the threads can be deleted and a through-core used instead. In the preferred embodiment the larger pipe comprises one end of a U-shaped member from the upper middle portion of which a downwardly extending slide pipe is provide. The lower end of the slide pipe is also embedded in concrete to provide a rigid construction.

Advantages of the invention include the fact that there is reduced need to plumb posts during installation and installation time is reduced as much as 50 percent. Also, the closed U-shaped pipes do not permit the entry of water which could subsequently freeze and split the pipe. Thus great economy of construction, installation and use is achieved.

A better understanding of the preferred embodiment of the invention will be achieved when the following detailed description is considered in conjunction with appended drawings in which like reference numerals are used for the same parts as illustrated in the different figures.

BRIEF DESCRIPTION OF THE DRAWING

FIG. 1 is a perspective view of the preferred embodiment;

FIG. 2 is a sectional view taken along lines 2—2 of FIG. 1;

FIG. 3 is a sectional view taken along lines 3—3 of FIG. 1;

FIG. 3A is a section view similar to FIG. 3 but illustrating an alternative mode of connection of the constituent components;

FIG. 3B is a sectional view similar to FIG. 3 but illustrating a further alternative mode of connection of the constituent components;

FIG. 4 is a sectional view taken along lines 4—4 of FIG. 1;

FIG. 5 is a sectional view taken along lines 5—5 of FIG. 4;

FIG. 6 is a sectional view taken along lines 6—6 of FIG. 4;

FIG. 7 is a transverse sectional view illustrating a further embodiment of the invention in which an angle frame is connected to vertical post member and provides support for transverse platform boards;

FIG. 8 is a sectional view taken along lines 8—8 of FIG. 7;

FIG. 9 is a sectional view taken along lines 9—9 of FIG. 7;

FIG. 10 is a perspective view of yet another alternative embodiment in which expanded metal mesh defining a deck is supported by angle frame means;

FIG. 11 is a sectional view taken along lines 11—11 of FIG. 10; and

FIG. 12 is a perspective view of a mechanical assembly which is similar to the embodiment of FIG. 10 but employs an embossed plate for forming the deck.

DESCRIPTION OF THE PREFERRED EMBODIMENT

Attention is initially invited to FIG. 1 of the drawings which illustrates the preferred embodiment of the invention as it would be installed in a conventional playground location. More specifically, the preferred embodiment comprises a first U-shaped pipe member 10 and a second U-shaped pipe member 12 with the U-shaped pipe members being joined together by a plurality of transversely extending horizontal pipes in a manner to be discussed. The first U-shaped pipe member 10 comprises a front vertical leg 14 and a rear vertical leg 16 which are joined at the top by curved portions 15 and 17 to a horizontal pipe portion 18. Similarly, the second U-shaped pipe member 12 is formed of a front vertical leg 20, a rear vertical leg 22, curved portions 21 and 23 and a horizontal pipe portion 24. For purposes of description, the "front" portion of the preferred embodiment is that side defined by legs 14 and 20 and the "rear" is that side defined by legs 16 and 22. The first U-shaped pipe 10 is provided with a pair of horizontal rungs 26, 28 which are welded in position and the second U-shaped pipe member 12 is provided with three horizontal rungs 30, 32 and 34 provided in its lower extent.

Mounting connections for the structure extending between the U-shaped pipe members 10 and 12 a provided by front lower lug plate members 40 and 42 which respectively extend rearwardly from the front vertical legs 14 and 20 as best shown in FIG. 2. Similarly, rear forwardly extending lower lug plate members 44 and 46 extend forwardly from the rear vertical leg members 16 and 22 as also shown in the Sectional view of FIG. 2. Front upper lug plates 50 and 52 extend forwardly from the curved portions 15 and 21. Similarly, a rear upper lug plate 54 extends rearwardly from the curved pipe portion 17 as shown in FIG. 5 and a similar non-illustrated rear upper lug plate extends rearwardly from the curved portion 23 of the other U-shaped pipe member 12.

Each of the lug plates is basically identical to the other lug plates and the structure of each lug plate will be understood to be the same as that of lug plate 52 illustrated in FIG. 3. The lug plate includes an outer surface 56 and an inner surface 58 with a aperture 60 being provided in its outer extent. An outer open-ended tubular sleeve means 62 is welded to the outer surface 56 so that it faces outwardly of the structure and has its axis coextensive with the axis of aperture 60. Similarly, an inner tubular sleeve means 64 is welded to surface 58 and faces inwardly with its axis coextensive with the axis of the opening 60.

Transversely extending upper pipe member 66 has an outer diameter slightly less than the inner diameter of the tubular sleeve member 64 so that is outer end can be matingly positioned internally therein as clearly shown in FIG. 3. Additionally, a transverse plug 68 is secured by crimping, welding or the like internally of pipe member 66 near each of its outer ends and has a threaded axial opening for receiving the threads of a bolt 70 which passes through the aperture 60 in the lug plate 52 and is of sufficiently smaller diameter as to clear the threads thereon. The opposite end of the transversely extending upper pipe member 66 is similarly mounted in the inner tubular sleeve means 64 of the front upper lug plate 50.

A front lower transverse horizontal support pipe 72 is mounted in exactly the same manner as pipe 66 in the inner tubular sleeve member 64 welded to lug plate members 40 and 42 and a rear lower transverse horizontal support pipe 72 is similarly mounted in the inner tubular sleeve member 64 welded to the rear lower lug plate member 44 and 46 as clearly shown in FIG. 2.

A plurality of wooden timber members 76 is provided on the transverse horizontal support pipe 72 and 74 with the timber members being separated by washer-like spacers 78. It will be observed that the timbers are provided with bore openings which the pipe members 72 and 74 extend so that it is impossible to remove the timber members from the supporting pipes. Alternatively, a metal deck could be provided on pipes 72 and 74.

An upper rearwardly extending U-shaped pipe 80 is externally mounted on the upwardly extending lug plate provided on the curved pipe portion 17 and 23. The manner of such external mounting will be understood by reference to FIGS. 5 and 6. More specifically, the pipe member 80 is of larger diameter than the diameter of pipes 66 etc. and has an internal diameter of sufficient dimension to permit it to fit over the inner and outer tubular sleeve members 62, 64 on rear upper lug plate 54 and the identical lug plate on the curved pipe portion 23 as shown in FIGS. 5 and 6. The end of pipe member 80 is curved to snugly engage the surface 17 as shown in FIG. 5 and the pipe is maintained in position by threaded screw means 82 which is threadably engaged with the threads provided in the aperture 60 of the lug plate 54 as illustrated in FIG. 6. Alternatively, aperture 60 could be a plain bore and screw means 82 could be self-threading or secured by means of a carriage bolt.

Thus, it will be seen that the unique arrangement permits the same lug plate assembly to be used for providing an internal connection for a smaller pipe such as pipe 6 or an external connection for a larger pipe such as pipe 80. It is consequently possible to provide various modifications of the structure with no mechanical alterations being necessary.

A vertical slide pipe 82 extends downwardly from the upper rearwardly extending U-shaped pipe 80 and it should be observed that the U-shaped pipe 80 could be mounted on the other side of the assembly in place of pipe 66 if desired. Also, slides can be attached to the assembly by connection to the various brackets if desired.

The entire structure is assembled with the lower ends of pipes 14, 20, 16 and 22 being provided in excavations in the earth. The bolt members 70, 82 connecting the horizontal pipe members to the various lug plates are tightened to provide a rigid assembly which is plumbed and concrete 86 is then provided in the excavations. Following hardening of the concrete an entirely rigid assembly is provided and the assembly will remain rigid even if the bolt members 70 are removed. Thus, the assembly is highly resistant to vandalism.

Numerous modification of the preferred embodiment will undoubtedly occur to those of skill in the art and it should be understood that the spirit and scope of the invention is to be limited solely by the appended claims.

FIG. 3A illustrates an alternative method for connecting a lug plate to a pipe member such as a vertical leg 22 comprising a unitary extension from a half-cylinder clamp component 100 which cooperates with a second half-cylinder clamp component 102 to embrace the leg member 22. Clamp components 100 and 102 are clamped to the leg member by the operation of first and second bolt and nut assemblies 104 and 106. Lug plate 52' is provided with an outer tubular sleeve means 62' that is precisely identical to previously discussed sleeve 62.

FIG. 3B illustrates a further alternative embodiment for connecting a lug plate 152' having a tubular sleeve means 162' identical to tubular sleeve means 62 to a leg member 22. The embodiment of FIG. 3B is identical to the embodiment of FIG. 3A with the exception of the fact that the lower nut and bolt assembly 106 of FIG. 3A has been eliminated in favor of an interleaved pivot connection connecting half-cylinder clamp component 100' to half-cylinder clamp component 102'. The other side of the connection is provided by a nut and bolt assembly 104'. Thus, the half-clamp components 100' and 102' pivot about an axis P and are clamped to the pipe 22 by operation of the nut and bolt assembly 104'.

FIGS. 7, 8 and 9 illustrate another embodiment of the invention in which lug plates 40 and associated inner tubular sleeve means 64 support a deck formed of transverse boards 76'. The boards 76' are connected by bolt and nut assemblies 118 to a rectangular metal deck frame comprising side angle frame members 124 and 126 and front and rear angle frame members 120 and 122. The rectangular metal frame which comprises elements 120, 122, 124 and 126 is supported by the inner tubular sleeve means 64 which extend through apertures provided in vertical web portion 124' and 126' of the angle members 124 and 126 respectively. A large retainer washer 128 is positioned over the inner end of the inner tubular sleeve means 64 and is held in position by nut and bolt assembly 130 as best shown in FIG. 9. Thus, the entire deck assembly is held in position and cannot be easily removed. Moreover, the construction permits the use of lighter weight lumber materials and in the event of breakage, replacement is easily effected.

The embodiment of FIG. 10 is similar to the embodiment of FIG. 7, etc.; however, the deck comprises a panel of expanded metal 132 instead of boards. The panel 132 is welded to the frame members 120, 126, 122 and 124 to provide a rugged and reliable construction. The frame members are maintained in position by a pair of transverse horizontal support pipes 172 which are identical in construction and mounting to previously discussed horizontal support pipes 72 and 74 which are held in position by bolt means 170. Even if the bolt means 170 are removed, the pipes 172 cannot be removed and the deck will remain in position.

The embodiment of FIG. 12 is identical to the embodiment of FIGS. 10 and 11 with the exception of the fact that the FIG. 12 embodiment employs a diamond studded embossed plate 134 welded to the frame means 120, etc. instead of the expanded metal 132 of the FIG. 10 embodiment. The metal mesh 132 and embossed plate 134 could be plastic coated, or entirely formed of plastic, if desired.

Thus, the present invention is directed to a unique mechanical assembly permitting the connection between first and second structural members such as members 14 and 20, 15 and 21, 16 and 22 and 17 and 23 for providing a vandal resistant connection between the structural members which is of particular use in playground equipment. However, it should be understood that the invention is not limited to playground equipment since its uses are many and varied as will be obvious to those of skill in the art. Therefore, the spirit and scope of the invention is to be limited solely by the appended claims.

What is claimed is:

1. A mechanical assembly providing a vandal resistant connection between first and second structural members comprising:

a front lower lug plate extending rearwardly from said first structural member and having first and second parallel surfaces between which a bolt receiving opening extends;

open-ended tubular sleeve means extending outwardly both from said first and second parallel surfaces in surrounding relation to said bolt receiving opening;

said second structural member comprising a front lower hollow tube having an outer diameter no greater than the inner diameter of said open-ended tubular sleeve members so as to matingly fit therein with one end facing one of said parallel surfaces and plug means positioned internally of said front lower hollow tube inwardly of said one end thereof and including a threaded bore in alignment with said bolt receiving opening; and bolt means extending through said bolt receiving opening and threadably received in said threaded bore and having a bolt head fully enclosed within said tubular sleeve means and engaged with the other of said parallel surfaces for providing a fixed connection between said first and second structural members.

2. The assembly of claim 1 wherein said first and second structural members respectively comprise a first and second metal pipe members.

3. The assembly of claim 2 additionally including:

a rear lug plate extending rearwardly from said first metal pipe member and having first and second parallel surfaces between which a second opening extends;

second open-ended tubular sleeve means extending outwardly from both said first and second parallel surfaces in surrounding relation to said second opening;

an auxiliary metal pipe member having an open end fitted over said second open-ended tubular sleeve means with an end surface engaging the outer surface of said first metal pipe member; and threaded connector means extending through an aperture in said auxiliary metal pipe and threadably connected to said second opening for retaining said auxiliary metal pipe in connected relation to said first metal pipe.

4. The assembly of claim 3 wherein said first metal pipe comprises a first U-shaped pipe oriented in a vertical plane and having front and rear vertical legs each with an end portion fixedly positioned relative to a supporting surface and the assembly further including a second U-shaped pipe identical to said first U-shaped pipe oriented in a vertical plane in horizontal facing alignment to said first U-shaped pipe and connected to said fron tlower hollow tube.

5. The assembly of claim 4 wherein said front lower lug plate is mounted on an inner surface of said first leg in facing relation to the second leg of said first U-shaped pipe; and further including a rear lower lug plate aligned with said front lower lug plate and extending forwardly from an inner surface of said second leg in facing relation to the first leg of said first U-shaped pipe.

6. The assembly of claim 5 wherein said second U-shaped pipe includes front and rear lower lug plates and associated tubular sleeve means identical to and in alignment with the upper lug plate and asssociated tubular sleeve means on said first U-shaped pipe, said front lower hollow tube having a second end fitted in and connected by a bolt to the front lower lug plate of the second U-shaped pipe in the same manner as its first end is connected to the lower lug plate of the first U-shaped pipe and further including a rear lower hollow tube mounted on said lower lug plates in the same manner as said front hollow tube is mounted on the front lug plates, horizontally aligned front upper lug plates extending outwardly from the front sides of said U-shaped pipes with each of said front upper leg plates having open-ended tubular sleeve means mounted thereon and an upper transverse pipe having opposite ends mounted on and attached to said upper front lug plates in the same manner that said lower front hollow tube is mounted on and connected to the lower front lug plates and wherein, said second U-shaped pipe further includes a rear upper lug plate and associated open-ended tubular sleeve means extending rearwardly from said second U-shaped pipe and providing a connection to a second end of the auxiliary metal pipe in the same manner that the first end of the auxiliary metal pipe is connected to the rear upper lug plate of the first U-shaped pipe.

7. The assembly of claim 6 additionally including wooden platform means mounted on and extending across said front lower hollow tube and said rear lower hollow tube.

8. The assembly of claim 7 wherein said auxiliary metal pipe is of U-shaped configuration and extends rearwardly from said first and second U-shaped pipes and further including a vertical slide pipe extending downwardly from a central portion of said U-shaped auxiliary metal pipe to the supporting surface.

9. The assembly of claim 8 wherein said U-shaped pipes and said vertical slide pipe have their lower ends embedded in concrete in the earth.

10. The assembly of claim 9 wherein said first U-shaped pipe includes a plurality of horizontal rungs extending between its legs at a level lower than said wooden platform means and said second U-shaped pipe includes a plurality of horizontal rungs extending between its legs at a level above said wooden platform means.

11. The assembly of claim 10 wherein said wooden platform means comprises a plurality of parallel wooden timber members each having apertures fitted over said front and rear lower hollow tubes and separated by spacer means.

12. The invention of claim 11 wherein the inside diameter of said auxiliary pipe is sufficient to permit the ends of said auxiliary pipe to fit over said rear upper lug plates and associated tubular sleeve means with the axis of said tubular sleeve means being perpendicular to the axes of the ends of said auxiliary pipe.

13. Vandal resistant playground equipment comprising:
   first and second generally U-shaped metal tubular members each comprising front and rear legs embedded in concrete and an upper connecting arch-like portion connecting the upper ends of said front and rear legs of each respective U-shaped tubular members, said front vertical legs having axes positioned in a first plane and said rear vertical legs having axes in a second plane that is parallel to said first plane;
   a first plurality of support lug plates in a third plane extending outwardly from said first U-shaped metal tubular member;
   a second pluarlity of support lug plates extending outwardly from said second U-shaped tubular member and oriented in a fourth plane;
   each of said support lug plates including a transverse aperture aligned with a like transverse aperture of another support lug plate on the other one of said U-shaped tubular members;
   inwardly and outwardly facing retainer tubes coaxially positioned relative to each of said transverse apertures and respectively extending in a cantilever manner outwardly from opposite sides of the support lug plate in which their respective apertures are provided; and
   horizontal connecting tubes having opposite ends matingly received in aligned ones of said retainer tubes so as to engage in inwardly facing side of the support lug plate on which the associated retainer tube is mounted each connecting tube including an internally threaded bore adjacent each end and axially aligned with the associated retainer tube in which the end of the connecting tube is received.

14. The invention of claim 13 additionally including a generally horizontal metal deck frame mounted on said inwardly facing retainer tubes for support thereby; and
   deck means attached to said metal deck frame.

15. The invention of claim 14 wherein said deck means comprises a planar extending metal sheet-like member.

16. The invention of claim 14 wherein said deck means comprises a panel of expanded metal attached to said metal deck frame.

17. The invention of claim 13 wherein said first, second, third and fourth planes are vertical planes.

18. A vandal resistant connection assembly for connecting first and second rigid members comprising:
   a first support lug plate fixedly extending outwardly from said first rigid member;
   a transverse aperture extending through said first support lug plate;
   inwardly and outwardly facing retainer tubes coaxially positioned on opposite sides of said support lug plates aligned with said transverse aperture;
   a second support lug plate fixedly extending outwardly from said second rigid member;
   a second transverse aperture extending through said second support lug plate and being axially aligned with said first transverse aperture;

inwardly and outwardly facing retainer tubes coaxially positioned on opposite sides of said support lug plate relative to said second transverse aperture;

a tube having a first and second ends respectively positioned in one of said inwardly facing retainer tubes; and first and second bolt means respectively positioned in said first and second transverse apertures and having a threaded end and a bolt head enclosed within the confines of one of said outwardly facing retainer tubes; and first and second threaded female means fixedly internally positioned adjacent the ends of said tube for receiving the threaded end of one of said bolt means.

* * * * *